United States Patent
Bruce

(10) Patent No.: US 6,554,079 B2
(45) Date of Patent: Apr. 29, 2003

(54) EARTH WORKING DISC WITH LARGE NOTCHES

(76) Inventor: Douglas G. Bruce, 2223 Fourth St., Perry, IA (US) 50220

( * ) Notice: Subject to any disclaimer, the term of this patent is extended or adjusted under 35 U.S.C. 154(b) by 0 days.

(21) Appl. No.: 09/783,422

(22) Filed: Feb. 14, 2001

(65) Prior Publication Data

US 2002/0108764 A1 Aug. 15, 2002

(51) Int. Cl.$^7$ ............................................... A01B 15/16
(52) U.S. Cl. .................... 172/604; 172/601; 111/169
(58) Field of Search ................................ 172/604, 599, 172/601, 540, 574, 567, 568, 579, 613; 111/163, 166, 168, 169

(56) References Cited

U.S. PATENT DOCUMENTS

| | | | |
|---|---|---|---|
| 1,113,241 A | * | 10/1914 | Niesz |
| 2,269,051 A | | 1/1942 | Cahoy |
| 3,097,704 A | | 7/1963 | Gillespie |
| 4,098,349 A | | 7/1978 | Jilani |
| 4,099,576 A | * | 7/1978 | Jilani |
| 4,131,162 A | * | 12/1978 | Schmitz |
| 4,174,756 A | | 11/1979 | De Haai |
| 5,495,897 A | | 3/1996 | Javerlhac |
| 5,531,171 A | | 7/1996 | Whitesel |
| 5,620,055 A | | 4/1997 | Javerlhac |
| 5,787,994 A | * | 8/1998 | Friesen |
| 5,855,246 A | * | 1/1999 | Bruce |
| 6,199,608 B1 | * | 9/2000 | Peterson et al. |

FOREIGN PATENT DOCUMENTS

| | | | |
|---|---|---|---|
| CH | 221526 | | 6/1942 |
| DE | 313860 | | 7/1919 |
| DE | 1297371 | * | 6/1969 ................. 172/604 |
| FR | 2444395 | | 12/1979 |
| GB | 1110950 | | 4/1968 |

OTHER PUBLICATIONS

Copy—6 pages of a brochure entitled LA PIÑA—Industrias Angel Martinez Lopez, s.l.
Copy—4 pages of a brochure by OSMUNDSON—showing notched disc blades.
Copy—12 pages of a brochure entitled FORGES NIAUX—NIAUX160.
Copy of front cover page of a brochure entitled RECAMBIOS AGRICOLOAS—TARIFA DE PRECIOS 1994 BELLOTA.
Copy—5 pages of document from Deere & Company—235 Wing–Fold Disc—FURROW FILLER DISK ( –1980).
Copy of 4 pages from a brochure entitled Spare Parts for Agricultural Implements—OFAS.
Copy—2 sheets of a brochure entitled Ricambi Macchine Agricole—OFAS—date is 1998.

* cited by examiner

Primary Examiner—Victor Batson
(74) Attorney, Agent, or Firm—Sturm & Fix LLP

(57) ABSTRACT

A tillage member in the shape of a disc which has large notches which cause the disc to turn at the same speed as the forward speed of an implement to which it is attached, thereby mixing the soil instead of merely turning over the soil. In order to achieve this mixing and pulling up of the soil for incorporation purposes, the disc has an outer periphery with a concave side and a convex side. An opening in the center of the disc is provided for adapting the disc to be mounted for rotation about a generally horizontal axis. The disc has a plurality of notches in the outer periphery thereof and a plurality of projections disposed respectively between adjacent ones of the notches. The number of notches is no less than six and no more than nine and the number of projections is no less than six and no more than nine. Also, the depth of each notch is approximately fifty percent of the width of each notch. Each of the projections have a width at the outer periphery of the disc and the width of each projection equals the width of each notch±ten percent of the width of each notch. The disc is also larger than most discs and has a minimum diameter of twenty-two inches and a maximum diameter of forty-two inches.

6 Claims, 6 Drawing Sheets

Diameter: 22" to 42"

n = Notch width
p = Projection width
d = Depth

Minimum of 6 notches
Maximum of 9 notches
Minimum of 6 Projections
Maximum of 9 Projections THE SOIL IS DUG BY THE PROJECTIONS AND INCORPORATED BY THE POSITIVE DRIVING OF THE GIANT NOTCHES.

CHUNKS NOT SLABS ARE DUG BY THE GIANT PROJECTIONS VS. SLABS TURNED BY SMOOTH EDGE OR SMALL NOTCHES.

US 6,554,079 B2

EARTH WORKING DISC WITH LARGE NOTCHES

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF INVENTION

1. Field of the Invention

The present invention relates to an earth working disc and more particularly to one which is designed to mix the soil rather than to turn it over.

2. Description of Prior Art

Gangs of discs such as those shown in FIG. 11 and 12, are commonly used to till the soil by turning over the soil as the gang of discs move forwardly along a field. Some prior art discs do not have small notches for the purpose of chopping corn stalks or the like, but essentially these discs work just like the discs shown in FIGS. 11 and 12. These prior art discs work like an ice cream scoop which extends under a strip of soil and turns it over. In this prior art disc structure t shown in FIGS. 11 and 12, whether there are small notches in it or not, these discs tend to slip and create a lot of friction as it scoops up the dirt and turns it over. In other words, the discs of the prior art do not turn at the same speed that they move through the soil. The notches in the prior art structures are not big enough to force the blades to turn. Consequently there is a need for a disc blade that mixes the soil for incorporation purposes instead of merely turning it over.

BRIEF SUMMARY OF THE INVENTION

The present invention relates to a tillage member in the shape of a disc which has large notches which cause the disc to turn at the same speed as the forward speed of an implement to which it is attached, thereby mixing the soil and allowing the soil to be turned up in small chunks, some of which may pass through the large notches instead of turning over the soil. In order to achieve this mixing and pulling up of the soil for this purpose, the disc has an outer periphery with a concave side and a convex side. An opening in the center of the disc is provided for adapting the disc to be mounted for rotation about a generally horizontal axis.

The disc has a plurality of notches in the outer periphery thereof and a plurality of projections disposed respectively between adjacent ones of the notches. The number of notches is no less than six and no more than nine and the number of projections is no less than six and no more than nine.

Also, the depth of each notch is approximately fifty percent of the width of each notch. Each of the projections have a width at the outer periphery of the disc and the width of each projection equals the width of each notch±ten percent of the width of each notch. The disc has a minimum diameter of twenty-two inches and a maximum diameter of forty-two inches. In a preferred embodiment, the notch width is seven inches±one-half inch. Also in a preferred embodiment, all of the projections are substantially identical and all of the notches are substantially identical.

An object of the present invention is to provide a tillage member which does a better job of mixing the soil and incorporating than prior art tillage members.

Another object of the present invention is to provide a disc which has large notches and thereby turns at the same speed as the forward speed of an implement to which it is attached as contrasted with prior art discs that turn slower, slip and turn the soil over.

A further object of the present invention is to provide an improved disc for agricultural purposes.

Other objects, advantages, and novel features of the present invention will become apparent from the following detailed description of the invention when considered in conjunction with the accompanying drawings.

DETAILED DESCRIPTION OF THE INVENTION

Figure 1:
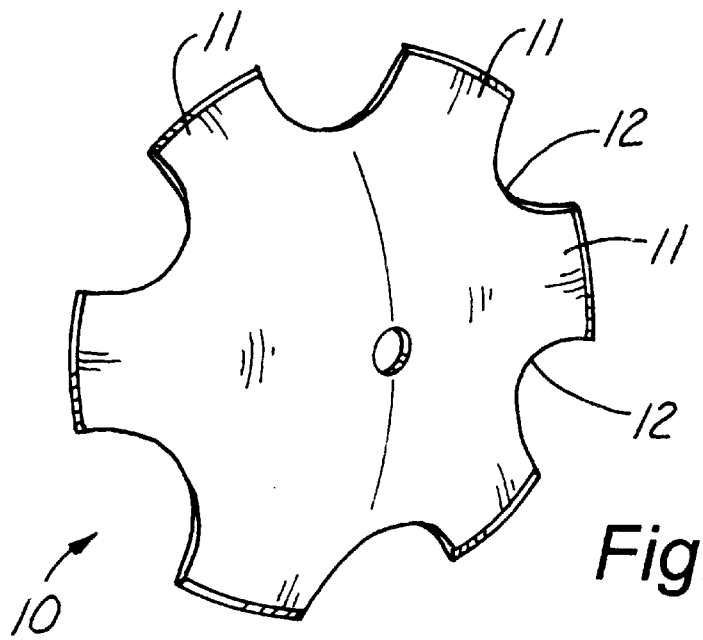
FIG. 1 is a perspective view of a disc constructed in accordance with the present invention.
Figure 2:
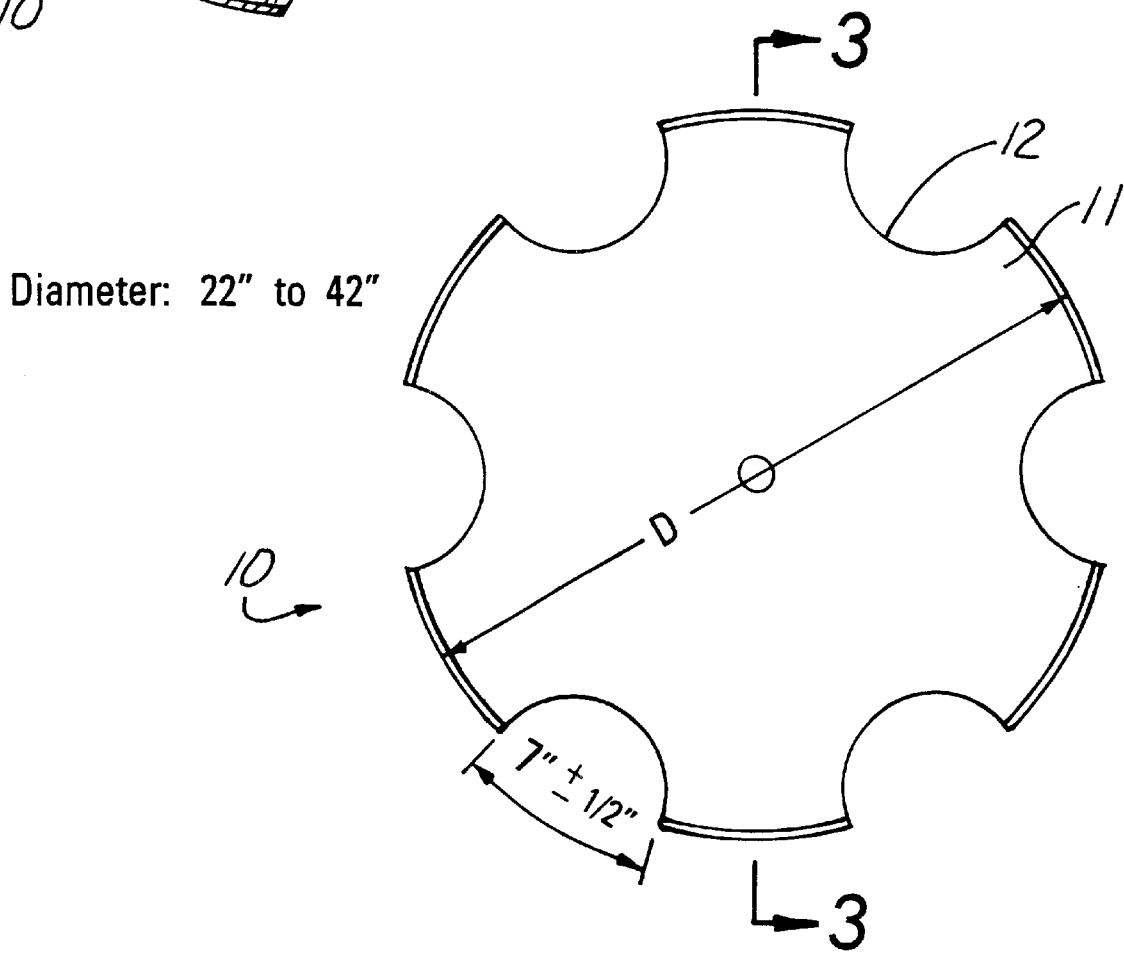
FIG. 2 is a side view of the disc of FIG. 1, showing certain dimensions thereon.

Referring now to the drawings wherein like reference numerals designate identical or corresponding parts throughout the several views, FIG. 1 shows a disc (10) having six projections (11) around the periphery thereof and six notches (12) disposed between each respective adjacent ones of the projections (11). As shown in FIG. 2, the diameter is defined as being between two opposing projections; or, in other words, the diameter of the outside of the arc of the projections (11) in the case of a disc that does not have an even number of projections.

The width of each notch is seven inches+one-half inch and is measured along the circumference of the diameter of the disc (10) in the case of a disc which is primarily circular in shape. It is to be understood that the notches (12) and projections (11) can be of other shapes, such as a trapezoidal shape as shown in British patent specification No. 1,110,950 to Van Der Lely, which application was filed Nov. 11, 1965. The notches could be the shape shown in U.S. Pat. No. 4,098,349 to Jilani issued Jul. 4, 1978 or V-shaped as shown in U.S. Pat. No. 5,620,055. It is preferable that each notch be the same shape and that each projection be the same shape to promote uniform wear, although someone who copies this invention should not be allowed to make minor changes and assert non-infringement.

Figure 3:
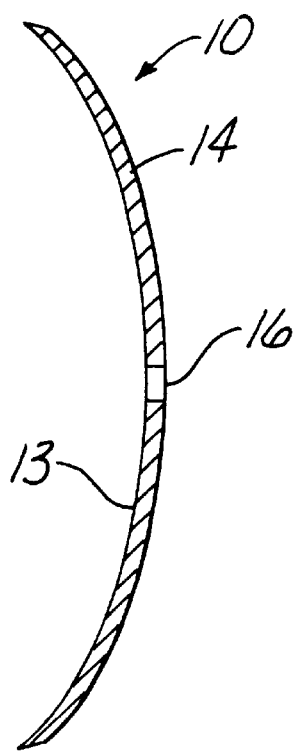
FIG. 3 is a cross sectional view taken along line 3—3 of FIG. 2.
Figure 10:
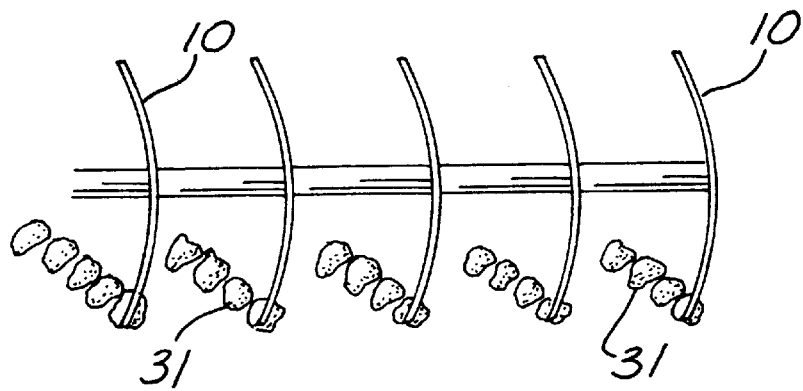
FIG. 10 is a view taken along line 11—11 of FIG. 9 and showing how chunks of soil are lifted by the large projections on the discs.

Referring to FIG. 3, a concave side (13) and a convex side (14) of the disc (10) is shown in the cross section of FIG. 3 which also shows a central opening (16) so that the disc (10) can be mounted to a shaft (17) as shown in FIG. 10, for example. It does not matter whether the disc (10) rotates on the shaft (17) or whether all of the discs (10) rotate with the shaft (17).

Figure 4:
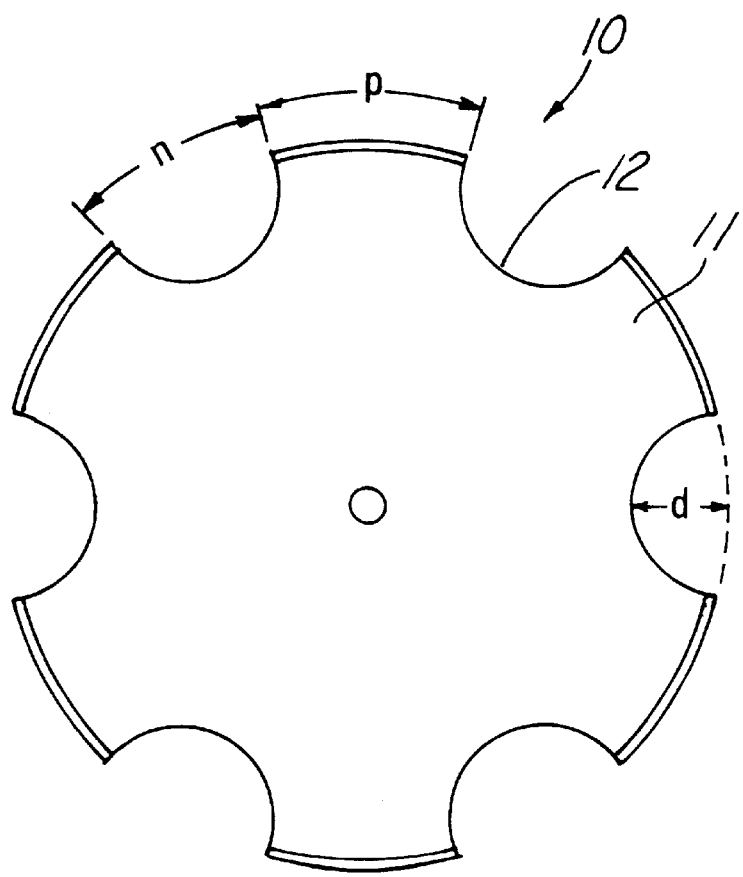
FIG. 4 is a view like FIG. 2 but showing other relationships of the disc blade.

Referring now to FIG. 4, it is noted that the notch width is designated by a letter "n" and the projection width is designated by the letter "p". These widths are measured along the arc of the outer peripheral diameter of the disc (10). FIG. 4 also shows the depth "d" of the notch (12) and in the case of some exotic shape "d" would merely be the effective depth thereof.

Figure 5:
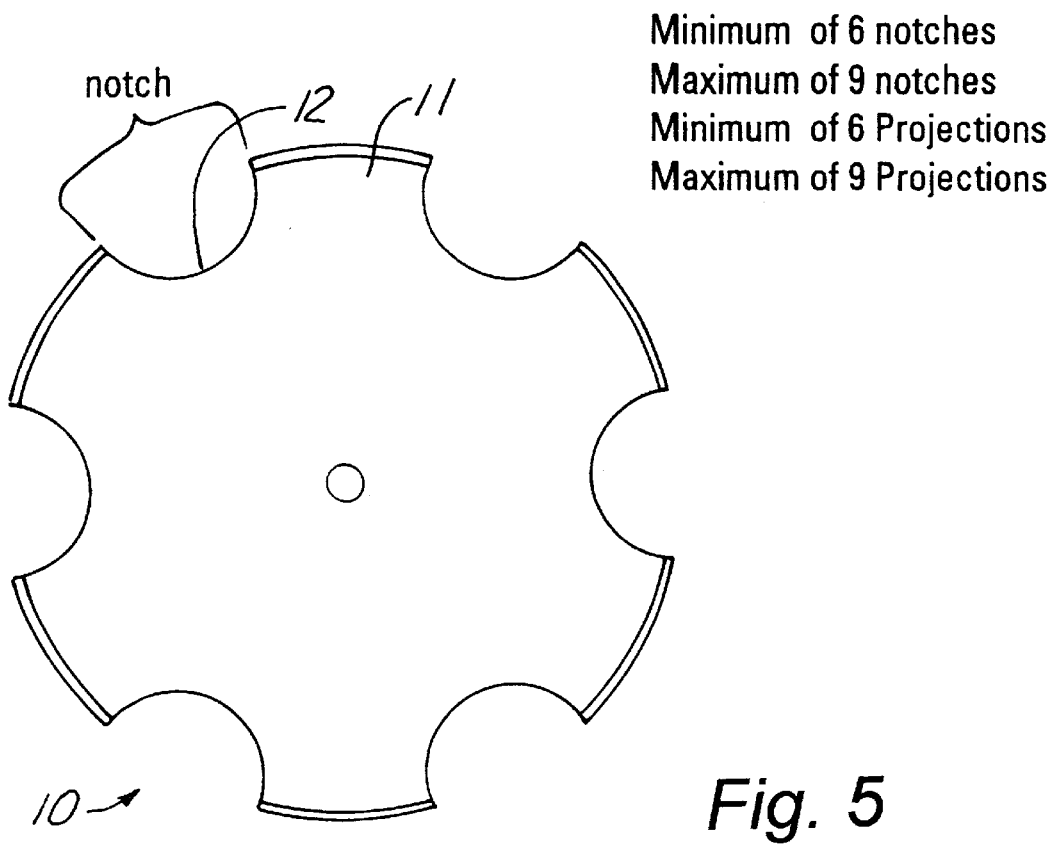
FIG. 5 is a view like FIG. 4 but showing still other relationships.

Referring now to FIG. 5, it is noted that the notch (12) is larger than prior art notches and that there is a minimum of six notches and a maximum of nine notches. Similarly there is a minimum of six projections and a maximum of nine projections.

Figure 6:
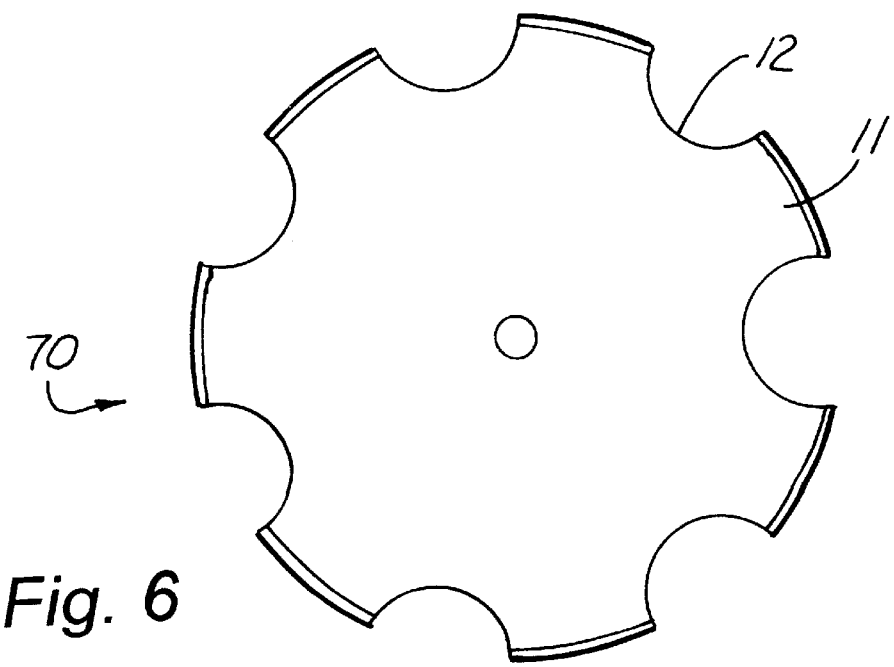
FIG. 6 is a view like FIG. 4 but showing still other relationships.

FIG. 6 shows another embodiment (70) which has seven projections (11) and seven notches (12).

Figure 7:
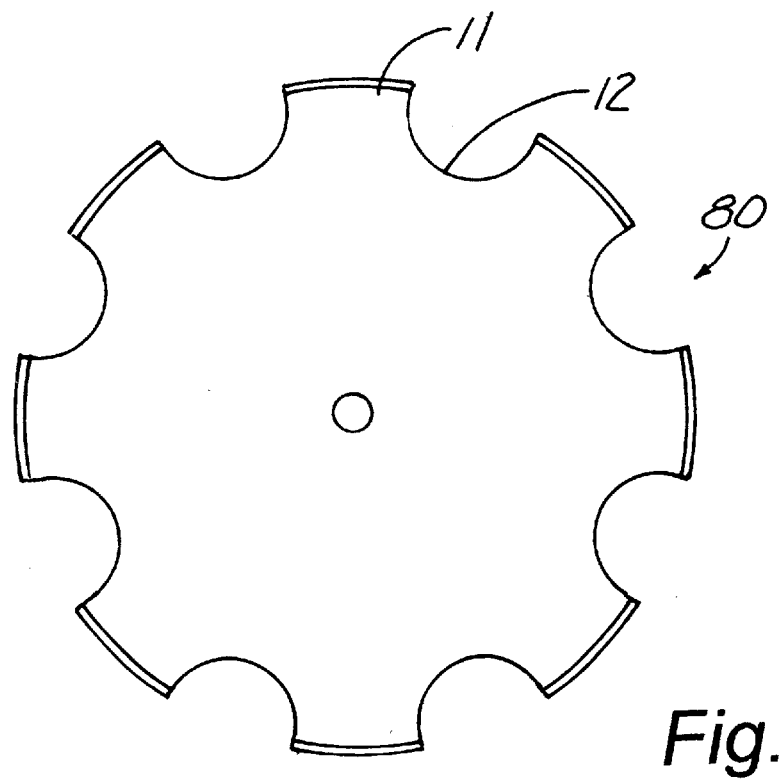
FIG. 7 is a view of another embodiment having eight notches and eight projections.

FIG. 7 shows still another embodiment (80) which has eight projections (11) and eight notches (12).

Figure 8:
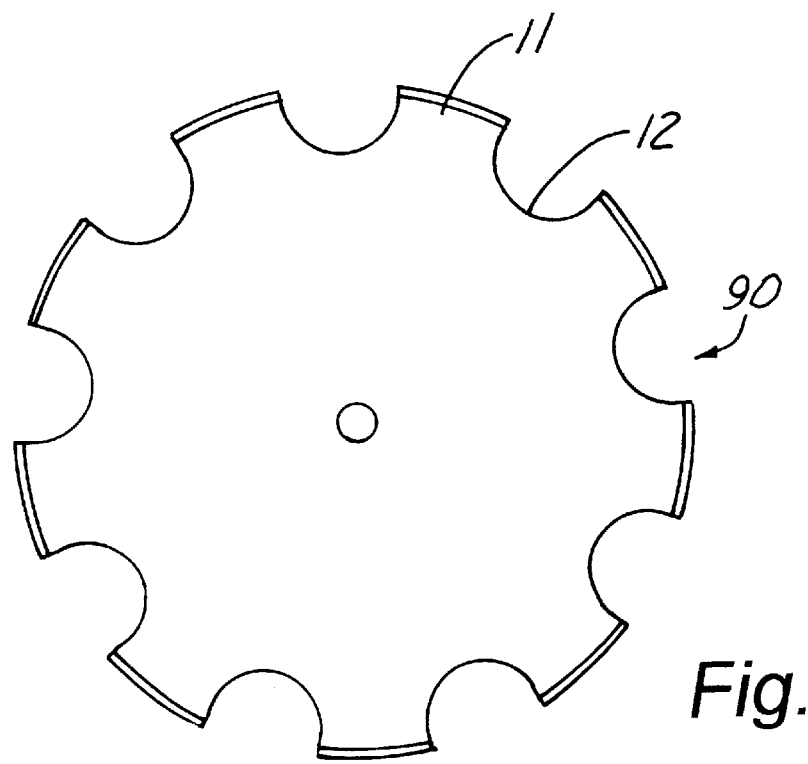
FIG. 8 shows another embodiment having nine projections and nine notches therein.

FIG. 8, similarly, is an embodiment (90) having nine projections (11) and nine notches (12).

Referring again to FIG. 9, it is noted that the discs (10) are rotatably attached to the shaft (17) and are pulled in a forward direction as indicated by the upper arrow. As the toolbar (21), to which the gang of discs (10) are attached, is pulled forwardly, the discs (10) will rotate in the direction of the arrows shown just under the toolbar (21), and as the discs (10) rotate forwardly and downwardly, they will tend not to slip because of the large notches. Note that when the notches are in the position shown by the arrow (12) in FIG. 9 the soil pushes on the edges of that respective projection edge to force the disc to turn. The pulling forward of the toolbar (21) will pull the disc (10) and the soil will effectively push on the notch (12) and projection (11) to turn the disc (10) positively. That will prevent slipping and cause the disc to rotate naturally at the same speed as the toolbar (21).

Figure 9:
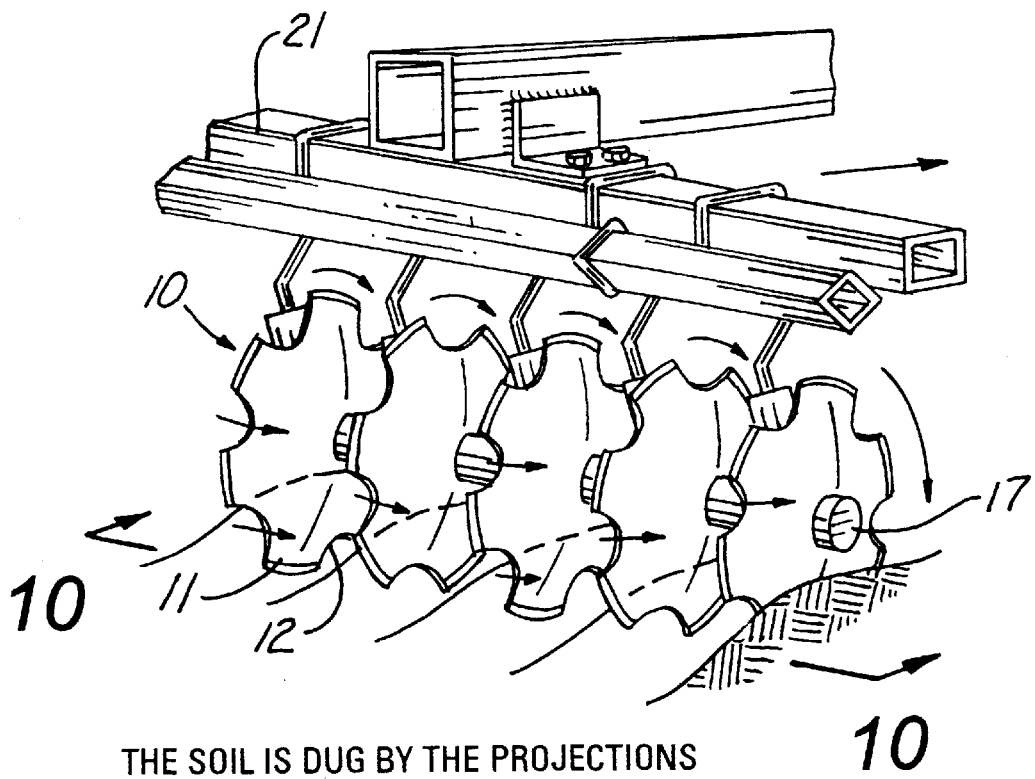
FIG. 9 is a perspective view of a gang of the discs shown in FIGS. 1–8 and showing how some of the soil is cut by the projections and is lifted and mixes the soil.
Figure 11:
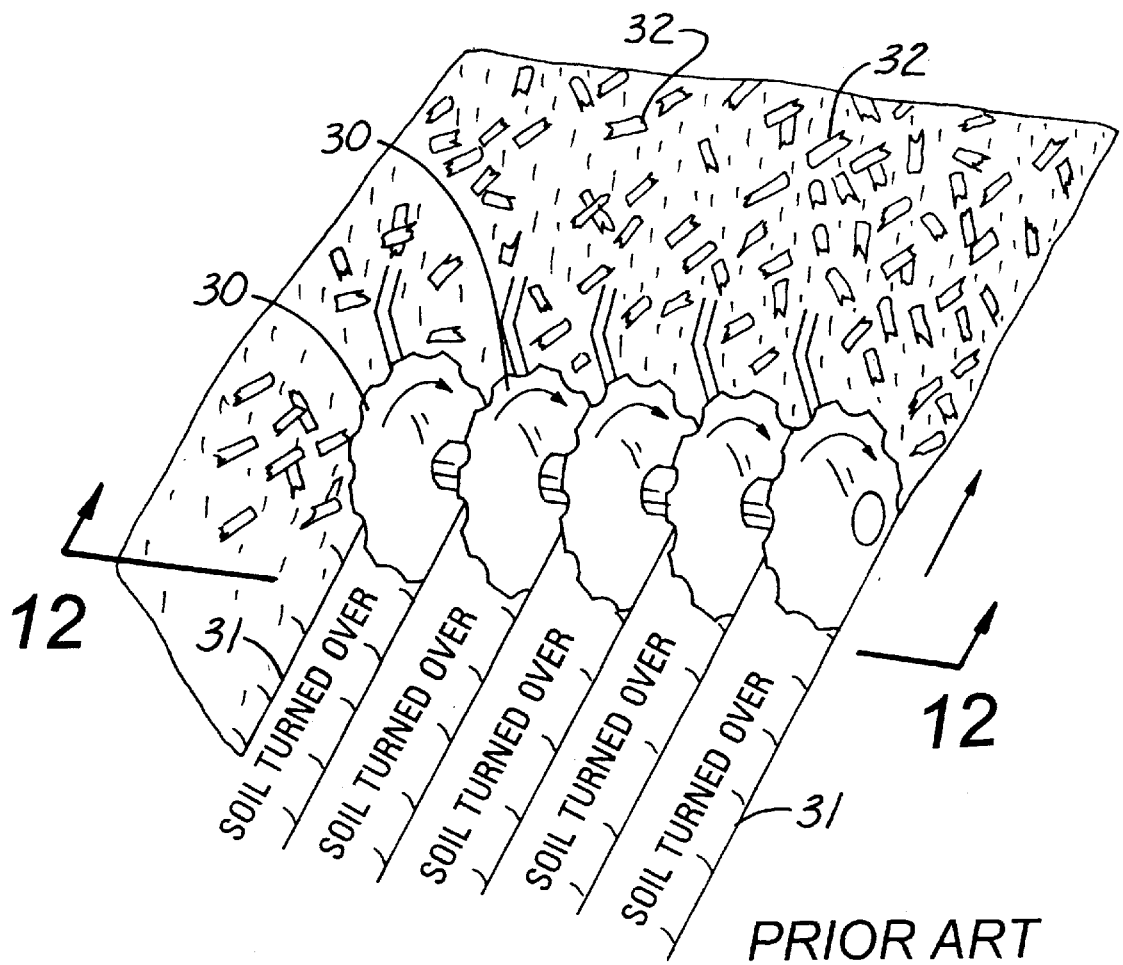
FIG. 11 is a partial perspective view of a prior art gang of discs showing how the soil is turned over as the gang of discs is pulled through the soil.
Figure 12:
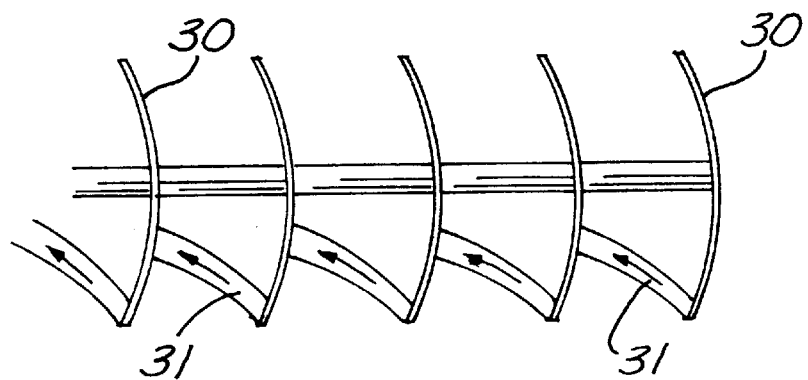
FIG. 12 is a view taken along line 13—13 of FIG. 11.

FIG. 10 shows how each large projection (11) digs up chunks of soil (31). This is very different than the disc (30) shown in FIGS. 11 and 12 which turns over continuous slabs of soil (31). A regular disc (30), as shown in FIGS. 11 and 12, will tend to slip in the ground rather than rotate at the same as the forward speed of the implement to which it is attached. These discs (30) operate like an ice cream scoop and turn the soil (31) over in a continuous slab so that one can see the bottom thereof rather than lifting the soil and mixing it as in the present invention as shown in FIGS. 9 and 11. FIG. 11 shows crop residue (32) on top of the soil (31) where it has not been turned over, whereas behind the discs (30) it is shown how the soil has been turned over so that most of the residue (32) is underneath the strips of soil (31) which have been turned over, rather than mixed up and incorporated with the soil as in the FIGS. 10 and 11 embodiment of the present invention.

Accordingly, it will be appreciated that the preferred embodiment does indeed accomplish the aforementioned objects. Obviously many modifications and variations of the present invention are possible in light of the above teachings. It is therefore to be understood that, within the scope of the appended claims, the invention may be practiced otherwise than as specifically described.

What is claimed is:

1. A tillage member comprising:

a disc having an outer periphery, a concave side and a convex side;

an opening in the center of said disc for adapting the disc to be mounted for rotation about a generally horizontal axis;

said concave side being concave from the outer periphery of the disc to the opening of the disc and said convex side being convex from the outer periphery of the disc to the opening of the disc;

said disc having a plurality of notches in the outer periphery thereof and a plurality of projections disposed respectively between adjacent ones of said notches, the number of notches being no less than 6 and no more than 9, the number of projections being no less than 6 and no more than 9, said notches having a depth (d) and a width (n);

the depth (d) of each notch being approximately 50 percent of the width (n) of each notch;

each of said projections having a width (p) at the outer periphery of the disc;

the width (p) of each projection equals the width (n) of each notch plus or minus ten percent of the width (n) of each notch; and wherein a diameter of the disc from one of the projections on one side of the outer periphery of the disc to one of the projections directly opposite thereto on the other side of the outer periphery of the disc being a minimum of 22 inches and a maximum of 42 inches.

2. The tillage member of claim 1 wherein said notch width is seven inches plus or minus one half inch.

3. The tillage member of claim 1 wherein all of the projections on said disc are substantially identical.

4. The tillage member of claim 3 wherein all of the notches in said disc are substantially identical.

5. The tillage member of claim 1 wherein all of the notches in said disc are substantially identical.

6. A plurality of tillage members of claim 1 rotatably disposed in a gang for tilling the soil.

* * * * *